(12) United States Patent
Marshall et al.

(10) Patent No.: US 8,464,728 B2
(45) Date of Patent: Jun. 18, 2013

(54) BIODEGRADABLE COMPOSITES

(75) Inventors: Colin Marshall, Wigton (GB); Jamie Moffat, Wigton (GB)

(73) Assignee: Innovia Films Limited, Wigton, Cumbria (GB)

( * ) Notice: Subject to any disclaimer, the term of this patent is extended or adjusted under 35 U.S.C. 154(b) by 0 days.

(21) Appl. No.: 12/893,572

(22) Filed: Sep. 29, 2010

(65) Prior Publication Data

US 2011/0094526 A1    Apr. 28, 2011

(30) Foreign Application Priority Data

Oct. 23, 2009    (GB) .................................. 0918633.9

(51) Int. Cl.
*A24D 3/06* (2006.01)
(52) U.S. Cl.
USPC ............................ 131/345; 131/331; 131/332
(58) Field of Classification Search
USPC .......................................... 131/332, 345, 331
See application file for complete search history.

(56) References Cited

U.S. PATENT DOCUMENTS

| | | | | | |
|---|---|---|---|---|---|
| 3,756,253 | A | * | 9/1973 | Honda et al. ................... | 131/343 |
| 5,105,834 | A | * | 4/1992 | Saintsing et al. ............. | 131/334 |
| 5,856,006 | A | * | 1/1999 | Asai et al. ..................... | 428/393 |
| 5,891,375 | A | * | 4/1999 | Stall et al. ..................... | 264/187 |
| 6,506,873 | B1 | * | 1/2003 | Ryan et al. .................... | 528/354 |
| 6,776,168 | B1 | * | 8/2004 | Teufel et al. .................. | 131/345 |
| 2002/0096300 | A1 | * | 7/2002 | Yamashita .................... | 162/331 |
| 2006/0264130 | A1 | * | 11/2006 | Karles et al. .................... | 442/59 |

FOREIGN PATENT DOCUMENTS

| | | |
|---|---|---|
| DE | 10352152 | 6/2005 |
| EP | 0641525 A2 | 8/1995 |
| EP | 0706766 A2 | 4/1996 |
| GB | 1244609 | 9/1971 |
| GB | 2012552 | 8/1979 |
| WO | WO95/14398 | * 6/1995 |

OTHER PUBLICATIONS

UK Intellectual Property Office Combined Search and Examination Report under Sections 17 and 18(3).

* cited by examiner

*Primary Examiner* — Richard Crispino
*Assistant Examiner* — Dionne W Mayes
(74) *Attorney, Agent, or Firm* — Ping Wang; Andrews Kurth LLP

(57) ABSTRACT

The present invention concerns a biodegradable cigarette filter tow comprising composite filaments of cellulose and cellulose acetate, and a process for making such a filter tow comprising providing a solution dope comprising a blend of cellulose and cellulose acetate in an ionic liquid or in N-methylmorphilone-N-oxide (NMMO), and spinning casting the blend into a protic solvent to generate fibers or films, and converting the fibers or films into cigarette filter tow. The invention also concerns cigarette filters and cigarettes made from such a filter tow.

21 Claims, 1 Drawing Sheet

BIODEGRADABLE COMPOSITES

FIELD

The present invention concerns biodegradable composite materials, especially for use in cigarette filter tows.

BACKGROUND

The first cigarette filters were developed in the 1920s and were composed of crepe paper, sometimes together with cellulose wadding. Subsequent concerns over the adverse link between smoking and health led to a surge in demand for filters yielding lower tar levels. A dual filter comprising cellulose acetate fibres within a paper sheath was developed, allowing for the addition of other functional components such as activated carbon.

Further concerns over health, increased legislation and market pressures for reduced tar, nicotine and carbon monoxide levels require continued development in filter technology. Today the global market for cigarettes exceeds 5.8 trillion sticks per annum, 97% of which now contain filters. Of the filtered cigarettes 80.4% are made from standard cellulose acetate fibre (4.5 trillion sticks), 16.6% are classed as 'special' filters and 3% are made from polypropylene.

Typically cigarette filters comprise a "filter tow," generally crimped fibres of cellulose acetate, encased in a tipping paper. This invention is concerned with the filter tow component.

One of the most pressing issues for manufacturers of cigarettes and cigarette filters is the rate at which the filters biodegrade. Cellulose acetate filters can take between one month and three years to biodegrade, dependant on environmental conditions, which is not sufficiently fast to avoid the issue of litter. Discarded cigarette filters top the list of almost all coastal clean-up surveys. The issue of litter is not just a visual one, the toxins adsorbed by used cigarette filters have been found to leach into the environment, and present a potential biohazard.

A range of approaches to the preparation of biodegradable filter tow have been suggested and include the use of composites of cellulose acetate with other biodegradable polymers, additives for increasing the rate of degradation of cellulose acetate, cellulose acetate with a low degree of substitution (DS) for increased biodegradability, and biodegradable polymers such as PHB/PVB and starches as the filter tow raw material.

However, to date no satisfactory commercial solution has been found for producing consumer-acceptable filters that degrade sufficiently quickly to overcome the issue of litter. One main restriction to the above approaches has been achieving an acceptable compromise between the rate of biodegradability that can be achieved and the absorption profile/taste signature given by the filter material.

BRIEF DESCRIPTION OF THE FIGURES

The invention will now be more particularly described in the Examples which follow and which make reference to the following drawings.

DETAILED DESCRIPTION

Figure 1:
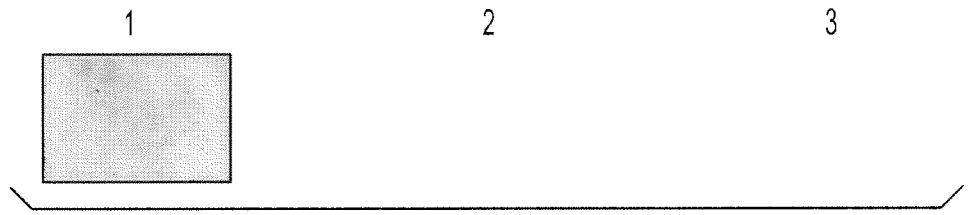
FIG. 1 shows three slides showing fibres of i) cellulose acetate; ii) cellulose; and iii) a blend of cellulose and cellulose acetate in accordance with the invention.

The present invention seeks to address these problems.

According to the present invention there is provided a biodegradable cigarette filter tow comprising composite filaments of cellulose and cellulose acetate.

Cellulose and cellulose acetate are typically cast in the form of fibres or films. Either form of casting is suitable for preparing the biodegradable cigarette filter tows of the invention. When cast in the form of films it is necessary then to shred the resulting film to produce material suitable for cigarette filter tows. Preferred filter tows in accordance with the invention comprise fibres spun from a coagulated solution of cellulose and cellulose acetate.

Reference herein to composite filaments of cellulose/cellulose acetate shall be understood to mean either fibres spun from a dope comprising cellulose and cellulose acetate, or shredded films cast from similarly constituted dope.

We have found that composite filaments of cellulose/cellulose acetate have significantly greater biodegradability than equivalent filaments comprising only cellulose or cellulose acetate. Without wishing to be bound by any such theory, we believe that the presence of acetate in the composite may disrupt the crystallinity of the cellulose, causing it to biodegrade more rapidly than cellulose itself.

Conventionally, cellulose is cast or spun from viscose, and it is difficult or impossible to cast or spin cellulose acetate from the same blend because of the likelihood of hydrolysis of the cellulose acetate under such conditions. Conversely, cellulose acetate is conventionally cast or spun from acetone and it is difficult or impossible to cast or spin cellulose from the same blend because of the limited solubility of cellulose in acetone.

However, we have found that by casting or spinning cellulose and cellulose acetate from an ionic liquid (IL) or from N-methylmorphilone-N-oxide (NMMO), it is possible to form spun fibres and cast films comprising a composite blend of these materials. The enhanced biodegradability of such composites and their suitability for use in cigarette filter tow manufacture has not previously been recognised.

Consequently, the cigarette filter tow of the invention is preferably formed from fibres or films of cellulose and cellulose acetate spun or cast as a blend from an ionic liquid (IL) or from N-methylmorphilone-N-oxide (NMMO).

The use of ILs and NMMO for dissolving cellulose and other polymers has been well documented, for example in US20050288484 and US 20070006774 of the University of Alabama. US20080188636 of the North Carolina State University and WO2005098546 of Holbrey et al. A wide range of ionic liquids, including those disclosed in the aforesaid publications, are suitable for dissolving cellulose and cellulose acetate and for casting as blends fibres or films therefrom. General types of suitable IL include those based on imidazole, pyrrole, thiazole or pyrazole cations in combination with halogen, phosphate, carboxylate or metal chloride anions. Particularly preferred ILs include 1-butyl-3-methylimidazolium chloride (BMIM-Cl) 1-butyl-3-methylimidazolium acetate (BMIM-Ac) and 1-ethyl-3-methylimidazolium acetate (EMIM-Ac).

The solution of cellulose and cellulose acetate from which fibres are spun or films are cast is referred to herein as a dope. The dope may also comprise an aprotic solvent such as DMSO, DMF, THF or dioxane to aid dissolution of the cellulose and/or cellulose acetate. One particularly preferred aprotic solvent is DMSO.

The blend of cellulose acetate and cellulose in the dope may also comprise one or more further thermoplastic materials, such as polyhydroxyalkanoates such as PHB and/or PHVB which may add further functionality, such as water barrier functionality, to the cigarette filter tows of the invention. Other functional additives may include triacetin, polyacrylonitrile (PAN), poly-2-hydroxyethylmethylacrylate (PHEMA), polyvinylalcohol (PVA), polyaniline and polyethylene glycol for functional purposes such as modification of absorption and/or taste profile, degradation enhancement (by, for example, water-soluble materials), and processability improvement, in connection for example with wet strength. (Triacetin may improve taste profile, as well as acting as a plasticiser.)

The weight ratio of cellulose to cellulose acetate in the dope, and consequently in the cigarette filter tow of the invention is from 10:90 to 90:10, for example from 20:80 to 80:20, or from 30:70 to 70:30.

Typically, the dope comprises a solids content of up to about 50% w/w, preferably up to about 40% w/w, more preferably up to about 30% w/w and most preferably up to about 20% w/w.

The filter tows of the invention may additionally comprise one or more plasticisers, such as triacetin, which may aid crimping of the composite filaments. In the cigarette filter tow of the invention the composite filaments of cellulose/cellulose acetate are preferably crimped to provide smoke barrier contact points. The plasticiser may be included in the dope, or may added subsequent to spinning or casting, for example by spraying onto the surface of the filter tow before or during crimping.

The filter tows of the invention may additionally comprise a catalyst promoting oxidative degradation of the filter tow. Suitable catalysts include iron and copper oxides and chlorides, which may be introduced into the tow by immersing the composite filaments in an aqueous solution of a water-soluble iron or copper salt, such as sulphate or chloride, and precipitating the oxide (preferably in nano-form) onto or into the filament by treatment with sodium hydroxide or other suitable precipitating agent.

The tows may also comprise one or more lubricants to reduce electrostatic charge. Preferred lubricants include mineral oils. For example, 1% w/w of mineral oil with an emulsifier may be applied to the composite filaments during spinning of the fibres or casting of the films.

Preferably the filter tows of the invention comprise composite filaments of cellulose/cellulose acetate manufactured at 1, 5 or 9 denier per filament (filament thickness (denier per filament) being defined as the mass (grams) of 9000 m of a single uncrimped filament).

The total tow mass (total denier) (defined as the total mass of 9000 m of uncrimped filter tow, typically comprising many thousands, for example 11,000, individual fibres) will vary considerably depending on the methods employed in fibre spinning and the number of individual fibres in the tow. One typical tow mass would 35,000 g.

Preferably the filter tows of the invention comprise fibres having a trilobal filament cross-section (optionally formed using triangular spinneret holes) to optimise surface area.

The filter tows of the invention preferably comprise crimped fibres, the crimp structure defined by the crimp index, which is the ratio between stretched (25 kg load) and unstretched (0.25 kg load) filter tow. The crimp index will vary considerably depending on the precise method of manufacture.

The moisture content of the cigarette filter tows according to the invention is preferably at least about 2% w/w, more preferably at least about 5% w/w, even more preferably at least about 10% w/w. Moisture content has been found to be important for preventing electrical charges, but should preferably not be too high (e.g. not higher than 50% w/w) because with a very high moisture content it may be difficult for the tow to retain a crimp.

The filter tows of the invention preferably comprise entangled filaments.

Also provided in accordance with the invention is a cigarette filter comprising the cigarette filter tow as hereinbefore described encased in a tipping wrapper.

Preferably the tipping wrapper is itself a biodegradable substance and may for example comprise paper or an alternative biodegradable substrate such as cellulose, PLA, hydroxyalkanoates, a starch based polymer, or other form of biopolymer.

When the tipping wrapper comprises a biopolymer, it preferably comprises a softener in an amount of not more than about 25% by weight to achieve suitable properties particularly in connection with elongation and tube curl.

The softener may in the biopolymeric tipping wrapper may be selected from any suitable material, but is preferably selected from glycerol, propane-1,2-diol, and any other suitable softener selected from the German Tobacco Ordnance (TVO) list.

Also provided in accordance with the invention is a cigarette comprising a smokable substance and a cigarette filter as hereinbefore described.

Also provided in accordance with the invention is a process for manufacturing cigarette filter tow comprising providing a solution comprising a blend of cellulose and cellulose acetate in an ionic liquid or in NMMO, and spinning or casting the blend into a protic solvent to generate fibres or films, and converting the fibres or films into cigarette filter tow.

Water is the preferred protic solvent for the regenerative casting of the blend.

In the process of the invention, composite cellulose/cellulose acetate materials can be produced at any ratio by regenerating solutions in water and/or other protic solvents. The rate of coagulation in water has been found to be dependant on the cellulose acetate content of the dope, where increased levels of cellulose acetate reduce the rate of coagulation.

The invention will now be more particularly described in the Examples which follow and which make reference to the following drawings:

FIG. 1 shows three slides showing fibres of i) cellulose acetate; ii) cellulose; and iii) a blend of cellulose and cellulose acetate in accordance with the invention.

Figure 2:
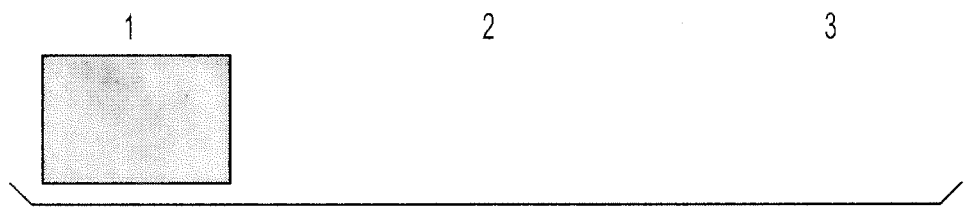
FIG. 2 shows the slides of FIG. 1 after 2 weeks biodegradation under anaerobic conditions.

FIG. 2 shows the slides of FIG. 1 after 2 weeks biodegradation under anaerobic conditions.

Figure 3:
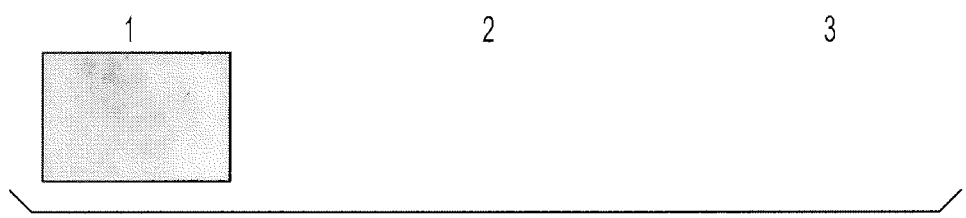
FIG. 3 shows the slides of FIG. 1 after 4 weeks biodegradation under anaerobic conditions.

FIG. 3 shows the slides of FIG. 1 after 4 weeks biodegradation under anaerobic conditions.

Figure 4:
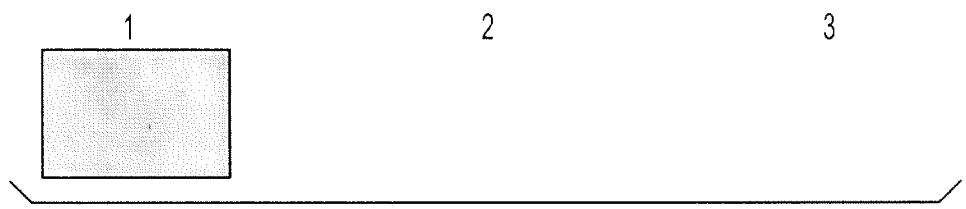
FIG. 4 shows the slides of FIG. 1 after 6 weeks biodegradation under anaerobic conditions.

FIG. 4 shows the slides of FIG. 1 after 6 weeks biodegradation under anaerobic conditions.

Example 1

The biodegradability of wet-spun fibres of blended cellulose/cellulose acetate was assessed in comparison with equivalent wet-spun fibres of cellulose, and equivalent wet-spun fibres of cellulose acetate.

Using standard wet-spinning equipment fibres were spun from solutions of i) cellulose (DP ~800) and ii) 1:1 cellulose:cellulose acetate (Eastman, Calif.-398-30), at 10% solids in EMIM-Ac:DMSO (20:80). A 40-orifice spinneret with an orifice diameter of 70 μm was used, which was submerged in a room temperature coagulation bath containing clean water. The fibres were reeled-up wet, extensively washed on the reel then dried at 50° C.

With reference to FIGS. 1 to 4, a surprising property of these composite materials is that the rate of biodegradation under anaerobic environments exceeds that of cellulose and greatly exceeds that of cellulose acetate under the same conditions (see appendix 1). It is thought (although this theory is in no way to be considered binding) that the two components form an intimately mixed composite and that the enhanced rate of degradation arises from a reduction in the crystallinity of the cellulose. Degradation of the cellulose component of the composite is thought to lead to the cellulose acetate component being deposited on a molecular scale. We have also found that the rate of biodegradation under aerobic conditions of the cigarette filter tows in accordance with the invention is similarly improved.

The application of these composite materials in the manufacture of cigarette filter tow offers a route to achieving a product with both the desired absorption profile/taste signature achieved by using cellulose acetate alone, but with greatly increased rates of biodegradation.

Example 2

Filter tow according to the invention is manufactured using a dry-spinning process. A dope is first prepared by dissolving cellulose diacetate and cellulose (1:1 blend) at 10% solids in EMIM-Ac:DMSO (20:80). $TiO_2$ is added to give a whitened appearance. The dope is then filtered and spun into chambers, causing the filaments to solidify and become thinner. More than 10,000 filaments are spun from a series of spinning cabinets, which are combined to form a single band. A stuffer box is used to emboss the filter tow with a crimp structure, and the resulting filter tow is encased in a tipping paper to form a cigarette filter.

The resulting cigarette filter is found to retain to advantageous biodegradability properties as shown in Example 1 and to have an acceptable taste signature.

What is claimed is:

1. A biodegradable cigarette filter tow comprising composite filaments of cellulose and cellulose acetate, wherein the cigarette filter tow has a moisture content of at least 2% w/w and wherein the filter tow is prepared so as to exhibit a rate of biodegradation in an anaerobic environment exceeding the rate of biodegradation in an anaerobic environment corresponding to otherwise equivalent fibers spun from cellulose alone or from a cellulose acetate alone.

2. The filter tow according to claim 1 further comprising one or more further thermoplastic materials.

3. The filter tow according to claim 2, wherein the further thermoplastic material is selected from one or more of PHB, PHVB, polyacrylonitrile (PAN), poly-2-hydroxyethylmethylacrylate (PHEMA), polyvinylalcohol (PVA), polyaniline and polyethylene glycol.

4. The filter tow according to claim 1, wherein the weight ratio of cellulose to cellulose acetate is from 10:90 to 90:10.

5. The filter tow according to claim 4, wherein the ratio of cellulose to cellulose acetate is from 20:80 to 80:20.

6. The filter tow according to claim 5, wherein the ratio of cellulose to cellulose acetate is from 30:70 to 70:30.

7. The filter tow according to claim 1 further comprising one or more plasticisers.

8. The filter tow according to claim 1 further comprising a catalyst promoting oxidative degradation of the filter tow.

9. The filter tow according to claim 1 further comprising one or more lubricants to reduce electrostatic charge on the tow.

10. A cigarette filter comprising the cigarette filter tow according to claim 1 encased in a tipping wrapper.

11. The cigarette comprising a smokable substance and a cigarette filter according to claim 10.

12. The filter tow according to claim 1, wherein the cigarette filter tow has a moisture content of at least 10% w/w.

13. The filter tow according to claim 1, wherein the cigarette filter tow has a moisture content of at least 5% w/w.

14. A process for manufacturing a cigarette filter tow comprising composite filaments of cellulose and cellulose acetate, wherein the cigarette filter tow is prepared so as to exhibit a rate of biodegradation in an anaerobic environment exceeding the rate of biodegradation in an anaerobic environment corresponding to otherwise equivalent fibers spun from cellulose alone or from a cellulose acetate alone, said process comprising providing a solution dope comprising a blend of cellulose and cellulose acetate in an ionic liquid and spinning or casting the blend into a protic solvent to generate fibres or films, and converting the fibres or films into cigarette filter tow.

15. The process according to claim 14, wherein the dope further comprises an aprotic solvent to aid dissolution of the cellulose and/or cellulose acetate.

16. The process according to claim 15, wherein the aprotic solvent comprises one or more of DMSO, DMF, THF or dioxane.

17. The process according to claim 16, wherein the aprotic solvent comprises about 80% DMSO.

18. The process according to claim 14, wherein the dope comprises a total solids content of up to about 20% w/w.

19. The process according to claim 14, wherein the dope comprises a total solids content of up to about 10% w/w.

20. The process according to claim 14, wherein the ionic liquid is selected from the group consisting of 1-butyl-3-methylimidazolium chloride (BMIM-Cl) 1-butyl-3-methylimidazolium acetate (BMIM-Ac) and 1-ethyl-3-methylimidazolium acetate (EMIM-Ac).

21. A biodegradable cigarette filter tow comprising crimped composite filaments of cellulose and cellulose acetate, wherein the filter tow comprises has a moisture content between about 10% to 50% w/w.

* * * * *